(12) United States Patent
Tnacheri et al.

(10) Patent No.: US 7,519,476 B1
(45) Date of Patent: Apr. 14, 2009

(54) METHOD OF SEISMIC INTERPRETATION

(75) Inventors: Nabil Ouazzani Tnacheri, Orsay (FR); Robert Eugene Bearnth, Coldspring, TX (US)

(73) Assignee: Seisnetics, LLC, Houston, TX (US)

( * ) Notice: Subject to any disclaimer, the term of this patent is extended or adjusted under 35 U.S.C. 154(b) by 130 days.

(21) Appl. No.: 11/777,413

(22) Filed: Jul. 13, 2007

Related U.S. Application Data

(60) Provisional application No. 60/820,716, filed on Jul. 28, 2006.

(51) Int. Cl.
G01V 1/40 (2006.01)
G01V 3/18 (2006.01)
G01V 5/04 (2006.01)

(52) U.S. Cl. ....................................................... 702/11

(58) Field of Classification Search .............. 702/11–14, 702/20, 179–181; 367/18, 73; 175/50; 703/9, 703/10
See application file for complete search history.

(56) References Cited

U.S. PATENT DOCUMENTS

| | | | |
|---|---|---|---|
| 5,255,345 A | 10/1993 | Shaefer | |
| 5,390,283 A | 2/1995 | Eshelman et al. | |
| 5,970,487 A | 10/1999 | Shackleford et al. | |
| 6,957,200 B2 | 10/2005 | Buczak et al. | |
| 7,373,251 B2 * | 5/2008 | Hamman et al. | 702/14 |
| 2002/0169559 A1 * | 11/2002 | Onyia et al. | 702/14 |

* cited by examiner

Primary Examiner—Michael P Nghiem
(74) Attorney, Agent, or Firm—Buskop Law Group, PC; Wendy Buskop

(57) ABSTRACT

A seismic data analysis method including: loading at least one seismic data volume to a database, performing unbiased sampling on a portion of the seismic data volume to obtain a plurality of unbiased sampling traces, selecting a plurality of trace positions from the unbiased sampling traces, computing a plurality of samples, identifying a first set of wavelets using the samples, computing at least one genotype, creating at least two subpopulations by applying the genotype to the seismic data volume, analyzing the subpopulations for fitness to identify at least one fit population, forming a merged subpopulation by mapping similarities in the first set of wavelets, computing a second sample by identifying a second set of wavelets, creating a mutated subpopulation by applying the genotype to the second sample, and inserting the mutated subpopulation into the seismic data volume to create a geopopulation that defines geological parameters of a subsurface formation.

15 Claims, 9 Drawing Sheets

METHOD OF SEISMIC INTERPRETATION

CROSS REFERENCE TO RELATED APPLICATIONS

The present application claims priority to co-pending US Provisional Patent Application Ser. No. 60/820,716, filed on Jul. 28, 2006, the entirety of which is incorporated herein by reference.

FIELD OF THE INVENTION

The present embodiments relate to a method of seismic interpretation that automatically extracts geological information, such as geological and reservoir structures, formations, and features from seismic data.

BACKGROUND OF THE INVENTION

Seismic interpretation is the art and science of finding, identifying, correlating, and understanding the geological structure of the subsurface and its layering through geologic time using seismic data. Human seismic interpretation is not a linear process where a discrete search, identification, correlation, and understanding are sequentially performed, but rather, it is a global iterative process that combines these steps in a non-deterministic manner using information concealed in the seismic data. Automation of such analysis of seismic data is a preferred approach, though the degree to which seismic data analysis has been automated has been limited. Two major picking techniques, volume interpretation and auto tracking, are used in the industry. Both techniques have provided great improvements to the seismic interpretation process, but a fully automated process is desired. A need exists for a method of volume interpretation and auto tracking to make a horizon picking processes for seismic data as efficient as possible. This picking can be partially automated, but requires the guidance of a human interpreter.

A need exists for a robust method of data analysis that does not rely on local analysis of such data.

A need exists for a fully automatic method for finding geological features from seismic data.

A need exists for a method for analyzing seismic data that is geologically more accurate than conventional techniques and ensures spatial coherence globally, and not merely locally.

The present invention meets these needs.

SUMMARY OF THE INVENTION

The present method allows geoscientists to automatically extract geological features out of seismic attribute data that has been obtained through seismic exploration, without requiring manual picking and editing or conventional volume based interpretation techniques to interpret the seismic data.

The present method utilizes a computer to extract geological features from seismic attribute data contained in one or more three dimensional volumes corresponding to two, three, or four dimensional seismic surveys.

The present method allows for the prediction of subsurface geological formations, such as a horizon or hydrocarbon reservoir, using geologic information, by carrying out calculations to determine the fitness of each item of geologic information.

The present method uses a genetic algorithm with at least the following components:

A method to create an initial population of potential solutions,

An evaluation function that plays the role of the environment, rating solutions in terms of their fitness;

A method for selecting and computing offspring solutions (genotypes) from previous generations;

A method to define the genotype of individuals according to a seismic attribute, which can be a wavelet for amplitude or a three dimensional cell for energy; and A method to compute fitness according to the seismic attribute.

The genetic algorithm is an adaptive method that can be used to solve optimization problems based on stochastic search methods. The genetic algorithm mimics the genetic process of biological evolution by extracting one or more geopopulations, which are populations that exhibit a high degree of fitness, from a volume of seismic data. Fitness is defined as a strong degree of similarity between individual members of a population, such as individual wavelets having similar amplitude, or individual three dimensional cells having similar energy.

The genetic algorithm operates over one or more generations of a population, redefining a genotype, which can be the average of each individual, as new individuals with high fitness are identified.

The genetic algorithm is powerful and is effective for a wide variety of optimization problems, such as those existing in medical, airline scheduling, stock market trading, adaptive control, and military fields.

The genetic algorithm has been adapted and applied to problems relating to seismic segmentation. The genetic algorithm provides a highly innovative, accurate, and robust method for imaging significant geological features present in the seismic data having high degrees of fitness.

The algorithm uses a defined set of parameters for each seismic data volume according to the type of its seismic attribute. For example, if the seismic attribute used is the amplitude, the definition of the individual genotype can include the location (x,y,z coordinates) of the seismic sample, and/or the type of the seismic event (peak, trough, or zero crossing) of a seismic wavelet. According to the type of the seismic attribute, the algorithm can use a correlation calculation or a Euclidian distance calculation to compute the fitness of each individual.

The initial population can have one or more sub-populations. Selected sub-populations are subjected to a crossover calculation to compute candidate individuals for which fitness can be calculated. Fit individuals are merged with respective subpopulations, forming a subpopulation, which can be used to generate a new population of solution candidates from which desired geological features can be determined.

BRIEF DESCRIPTION OF THE DRAWINGS

Other features and advantages of the method will be clear from reading the description hereafter, with reference to the accompanying drawings in which.

Figure 1:
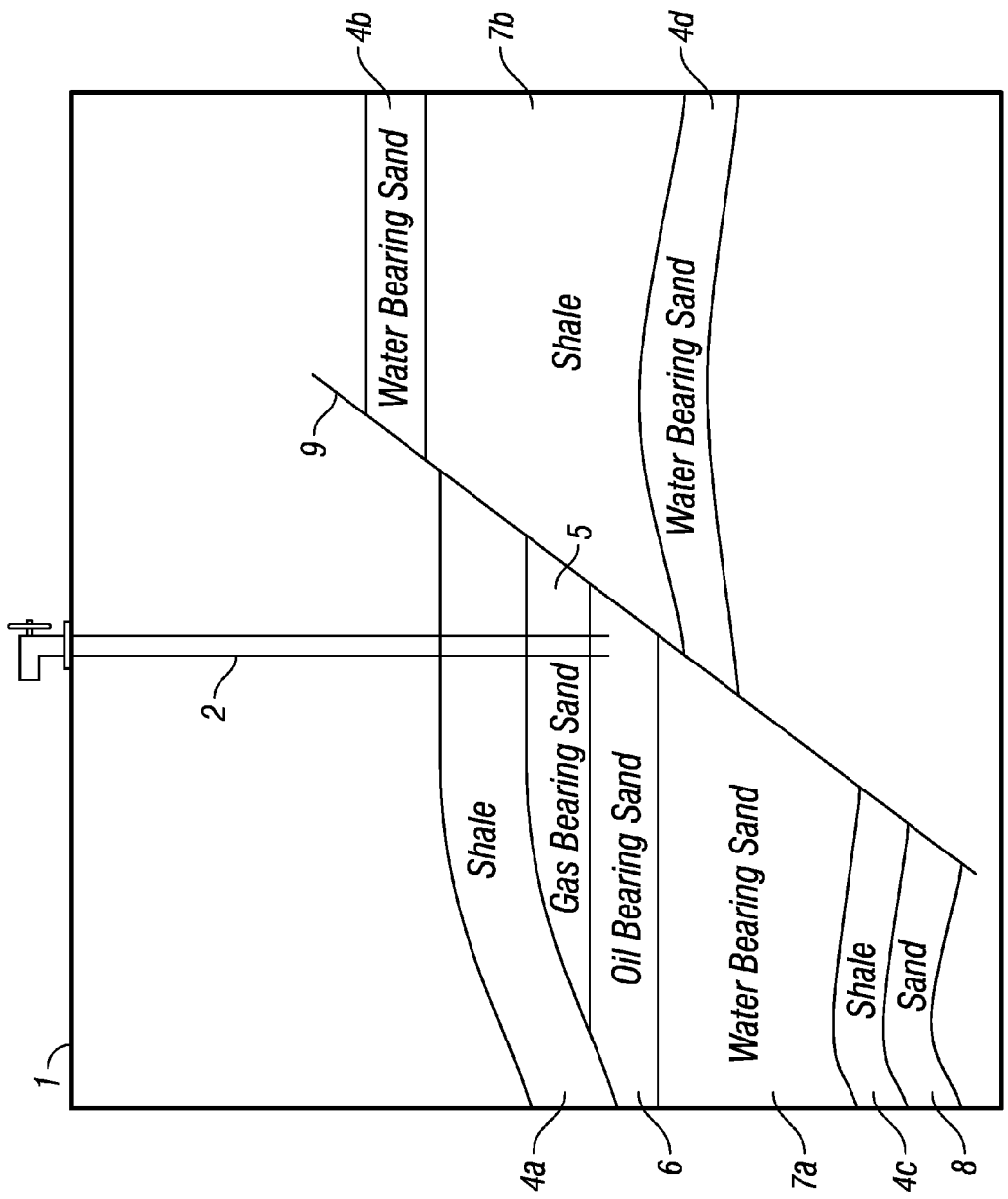
FIG. 1 is a diagram of exemplary rock strata.

The present invention is detailed below with reference to the listed Figures.

DETAILED DESCRIPTION OF THE PREFERRED EMBODIMENTS

Before explaining the present embodiments in detail, it is to be understood that the embodiments are not limited to the particular embodiments and that they can be practiced or carried out in various ways.

The present method relates to a seismic data analysis method for predicting geological and reservoir features or structures of the subsurface using at least one seismic data volume obtained through a geophysical exploration of the subsurface formation.

A geological feature can be a mineral reservoir or a geological formation, such as a water reservoir, a diamond reservoir, an oil reservoir, a natural gas reservoir, a gold reservoir, a salt reservoir or salt dome, a fault zone, a carbonate reef, an anticline, and other similar formations or reservoirs.

The present method can include loading one or more three dimensional seismic data volumes into data storage in communication with a processor. Each three dimensional seismic data volume can correspond to a two, three, or four dimensional seismic survey, relating to the subsurface formation. A four dimensional seismic survey can include multiple seismic traces of a three-dimensional subsurface formation performed over time, such as once per year. The one or more seismic data volumes can be categorized using the processor.

The seismic data volumes can include data such as inline traces of the subsurface formation, cross line traces of the subsurface formation, amplitudes of wavelets for the subsurface formation, depths of the subsurface formation, sample times of the subsurface formation, attributes of the subsurface formation, and combinations thereof. Seismic traces can be obtained through conventional seismic prospecting surveys, such as by arranging seismic receivers at points along the Earth's surface and carrying out recordings with the receivers. Seismic traces can also be calculated from real or simulated seismic amplitude or well data in any manner known in the art.

In a contemplated embodiment, the data storage can include computer instructions for instructing the processor to categorize the seismic data volumes based on spatial orientations in numerical values, such as positions along x, y, and z axes, amplitudes, and other wavelet characteristics such as phase, frequency, and zero crossing, thereby grouping seismic data having similar attributes.

The present method can then include performing unbiased sampling on at least a portion of the three dimensional seismic data volumes to obtain a plurality of initial traces. The unbiased sampling can be performed at random throughout each three dimensional seismic data volume, such as by using the processor in combination with a random number generator to select initial traces. The unbiased sampling can also be performed by dividing each three dimensional seismic data volume into sectors, which can be two-dimensional cells of predefined sizes, and randomly selecting one or more traces per sector.

A plurality of samples can then be computed along the plurality of initial traces. It is contemplated that the plurality of individuals can be computed by mapping using a zero-crossing analysis. Using a selected seismic attribute, such as amplitude, each individuals position and type (peak, trough, zero crossing) can be computed. The plurality of samples can include peaks, troughs, zero-crossings, or combinations thereof for each of the initial traces. Each individual within the plurality of samples is contemplated to be defined by its position (x,y,z) within a three dimensional lattice.

A genotype can be identified for each plurality of samples. The genotype can be an average representation of a plurality of samples. For example, the genotype can be a representative wavelet having an amplitude representative of the plurality of samples, however other representations can be used for other attributes. When the selected attribute is energy, coherency, or continuity, the genotype can instead be a small three dimensional cell, rather than a wavelet. The genotype can be extracted from the seismic data for selected samples or computed by a crossover calculation.

A plurality of fit samples can be identified by applying genotypes to members of the three dimensional seismic data volume that are close to the area of the volume represented by the genotype. The neighborhood of the seismic data volume to be examined can be predefined. This step can involve determining the fitness of each of the plurality of individuals by comparing their attributes, such as amplitude, frequency, phase, energy, zero crossing, coherency, consistency, or combinations thereof to the genotype representing the neighboring individuals. Fitness can be computed using a correlation calculation when the genotype is a wavelet, and a Euclidian distance calculation when the genotype is a cell. Fitness is computed for all individuals in the neighborhood represented by each genotype.

Fit individuals can be selected using a ranking method, such as only selecting the most fit fifty percent of examined individuals. A wheel method can also be used, which associates a selection probability proportional to each individual's fitness. A wheel is divided into a number of sectors equal to the number of examined individuals, each sector having a size proportional to the fitness of the corresponding individual. A number ranging from zero to the sum of all fitness can be generated at random to select individuals from the wheel.

A merged genotype can then be computed by combining the plurality of identified fit individuals with the original plurality of samples used to identify the original genotype. The merged genotype can then be used to compute a geopopulation that defines geological parameters or reservoir parameters of the subsurface formation by applying the merged genotype to the three dimensional seismic data volume. The geopopulation can contain all individuals having high fitness within the neighborhood of the merged genotype.

Multiple genotypes, fit populations, and geopopulations can be identified, including up to 1000 or more. The present method can include computing the fitness of each geopopulation, sorting a plurality of geopopulations according to their fitness, and merging neighboring geopopulations having similar fitness.

Geopopulations can be computed by the processor using computer instructions resident in the data storage. It is contemplated that the processor can be a server, though the processor can also be a powerful mobile computer, allowing for on-site, efficient processing. Computing can also be performed by transmitting seismic data volumes via a network, such as a virtual private network, a cellular network, a satellite network, or other similar networks to a server in communication with the network. In a contemplated embodiment, a client device, such as personal digital assistant, a cellular telephone, a laptop computer, or other similar devices can be used to access the networked server to view the results of the computations.

In an embodiment, fitness can be determined when the similarities between wavelets exceed a preset limit, such as when similarities between wavelets of a population are within ten percent. In another contemplated embodiment, fitness can be determined through similarities in physical appearance or any combination of attributes, such as amplitude, frequency, or phase.

The fit population can be enlarged by identifying and adding additional fit individuals.

It is contemplated that any individuals that belong to multiple geopopulations can be discarded to ensure that resulting geopopulations do not intersect with each other. It is contemplated that the present method can include use of a processor in communication with a network accessible by a remote location with a client device in communication with the network. For example, the present method can be performed using a processor located in the United States, while a user located in Europe can access the processor over a network, such as the Internet, using a client device, such as a cellular telephone, a computer, a personal digital assistant, or other similar devices.

Typically, seismic interpretation can be seen as a segmentation problem, where the objective is to segment seismic data into meaningful real world objects, which conventionally requires a human geoscientist. The present method utilizes both a bottom-up algorithm and a top-down algorithm to fully automate the process of segmentation.

The bottom up strategy is a three step process that begins at the lowest level, the sample, with the aim to exploit local information, such as by analyzing wavelets, randomly selected traces at the wavelet level, to build objects, and finally the model.

Step 1 involves preprocessing, at the level of the sample. Namely, data is transformed by computing attributes, such as continuity, coherency, and other measures of similarity, to highlight information that may be used to differentiate between samples.

Step 2 involves segmentation, at the level of the object, which involves detecting and segmenting regions that correspond to real world objects. Exemplary real world objects can be reservoir and/or geological type events that are detectable within a three dimensional seismic volume.

Step 3 involves understanding, which can involve human interpretation at the level of the model, to identify objects, find relationships between objects, and derive a geological understanding.

An algorithm is used to detect reflectors and other features to define the geology of an area.

Next, a top down algorithm is applied to segment the data using prior criteria to understand related faults or other physical criteria of an area, such as horizons and geobodies. The top down algorithm begins at a macro level and works toward the smaller components, including individual objects and samples.

To fully characterize a sample, the present method utilizes a function that computes the similarity between samples. The choice of this function is very important because it defines the criteria that control the manner in which samples are grouped into objects. It is not only based on a manner by which to distinguish between samples, but takes into account the global goal of the algorithm: to determine objects from individual samples. For example, when attempting to identify horizons, a seismic wavelet is a good representation of a sample, but the shape of a wavelet is more determinative than its amplitude values. A correlation regarding wavelet shapes is therefore the best way to discriminate between wavelets when looking for horizons.

Correlation for wavelet shapes can be calculated using the following equation:

$$d_a(s_i, s_j) = \sqrt{\frac{\int_{-z_0}^{z_1} a(z-z_i) a(z-z_j) dz}{\int_{-z_0}^{z_1} a^2(z-z_i) dz \int_{-z_0}^{z_1} a^2(z-z_j) dz}}$$

In the above, a is the attribute and da (distance) the corresponding similarity function. $z_i$ and $z_j$ are the coordinate of the sample. I, j, $z_0$ and $z_1$ are lengths of the interval below and above zero.

The correlation is calculated using true position $z_i$ and $z_j$ of samples, rather than their lattice positions, and a continuous integral instead of a discrete summation, because correlation is very sensitive to shifts in the wavelets.

Correlation for representations other than wavelets can be calculated using normalized Euclidean distance, rather than the above, using the following:

$$d_a(s_i, s_j) = \sqrt{\frac{\sum (a(x_k^i) - a(x_k^j))^2}{\sum a^2(x_k^i) \sum a^2(x_k^j)}}$$

It is contemplated that discrete summations are performed in the neighborhood of the samples $s_i$ and $s_j$. The normalized Euclidean distance is useful when determining the presence of vertical faults, rather than horizontal horizons.

Different distance functions can be combined when the seismic attributes represent non-contradictory objects. For example, it is not meaningful to make a summation of the above correlation and Euclidean distance functions when the first is used to compare wavelet shape to characterize horizons and the second is used to compare continuity values to characterize faults, because the two values would belong to two distinct objects. Horizons are horizontal subsurface objects, while faults are vertical subsurface objects. No single wavelet can be a member of multiple populations defining multiple objects.

When attempting to identify horizons, the seismic wavelet extracted from the seismic amplitude can often comprise the best solution to characterize the sample. Therefore, the seismic wavelet is a good candidate to be the genotype. In such a case, the correlation of wavelet shape, described above, can be used to determine the compatibility between individual wavelets. For this purpose, the length of the wavelet is very important. Conventional automated picking techniques have experienced difficulties when defining the length of a wavelet, often resulting in final data having no optimal value. The present method overcomes this difficulty by adapting the size of the genotype wavelet to take into account the local seismic character.

The wavelet is defined as a set of samples around the position of a given sample of a given type, such as a peak, trough, or zero crossing. Since the most important character is the shape of the wavelet, the value of the shape of the wavelet can be normalized, its values ranging from −1 to 1:

$$wavelet(z) = \frac{a(z)}{\max_{z_i \in [z_0, z_1]}(|a(z_i)|)}$$

In the above, a is the seismic amplitude attribute and $[z_0, z_1]$ the definition interval of the wavelet.

The wavelets of neighbor samples overlap. To have a good distinction between these neighbor samples, it is important to avoid the use of large overlap intervals Each wavelet size can then be adapted using a crossover. Only individual wavelets that have genotypes with sizes that are very close are allowed to crossover. Conventionally, this would require a geoscientist to define a constant threshold, however the present method instead uses the standard deviation of the lengths of each wavelet of samples that belong to the same subpopulation. Wavelets with a genotype represented by a wavelet with lengths that are different from another individual by more than the standard deviations of its parent subpopulation are not allowed to crossover.

When performing the crossover, the lengths of the offspring wavelets are calculated as the mean of the two parent wavelets. This enables the size of the wavelet to adapt to local character of the seismic neighborhood. The adapted size takes into account the seismic character of the individuals that became members of the subpopulation. If new member wavelets are added from an area of high frequency, the mean size becomes smaller, while if the wavelets are added from an area of low frequency, the mean size becomes larger.

To calculate the similarity based on correlation between wavelets, a linear interpolation calculation is used between samples, where peaks, troughs, and zero crossings are defined as special points on each wavelet and must be used for the calculation of the correlation.

$$wavelet(z) = (a(z_i + 1) - a(z_i)) \frac{(z - z_i)}{z_i + 1 - z_i} \text{ for } z \in [z_i, z_{i+1}]$$

Wavelet(z) is the value of the wavelet at any point z, a is the seismic amplitude, and $\{z_0, \ldots, z_n\}$ is the sample set.

In an embodiment, splines could also be used for a better representation and a straightforward calculation of correlation. This embodiment can require a significant computational overhead.

Data of a geological and seismic nature can be gathered about this type of formation for use in the method.

Turning now to the Figures, the embodiments can be better understood with reference to the Figures.

FIG. 1 depicts a portion of the earth's surface (1) having an oil well (2) extending from above the surface (1) into the earth. Oil well (2) could also be a gas well or another kind of well. Oil well (2) passes through a shale strata (4a). Beneath the shale strata (4a) is a gas bearing reservoir (5). Beneath gas bearing reservoir (5) is an oil bearing reservoir (6). Oil well (2) penetrates from surface (1) to oil bearing reservoir (6). Beneath oil bearing reservoir (6) is water bearing sand (7a), a second shale strata (4c), and additional sand (8).

Penetrating the various layers of strata is a fault cut (9) having additional strata on the side opposite the fault cut. Water bearing sand (4b) is depicted, having a shale strata (7b) beneath. Additional water bearing sand (4d) is beneath shale strata (7b).

Figure 2:
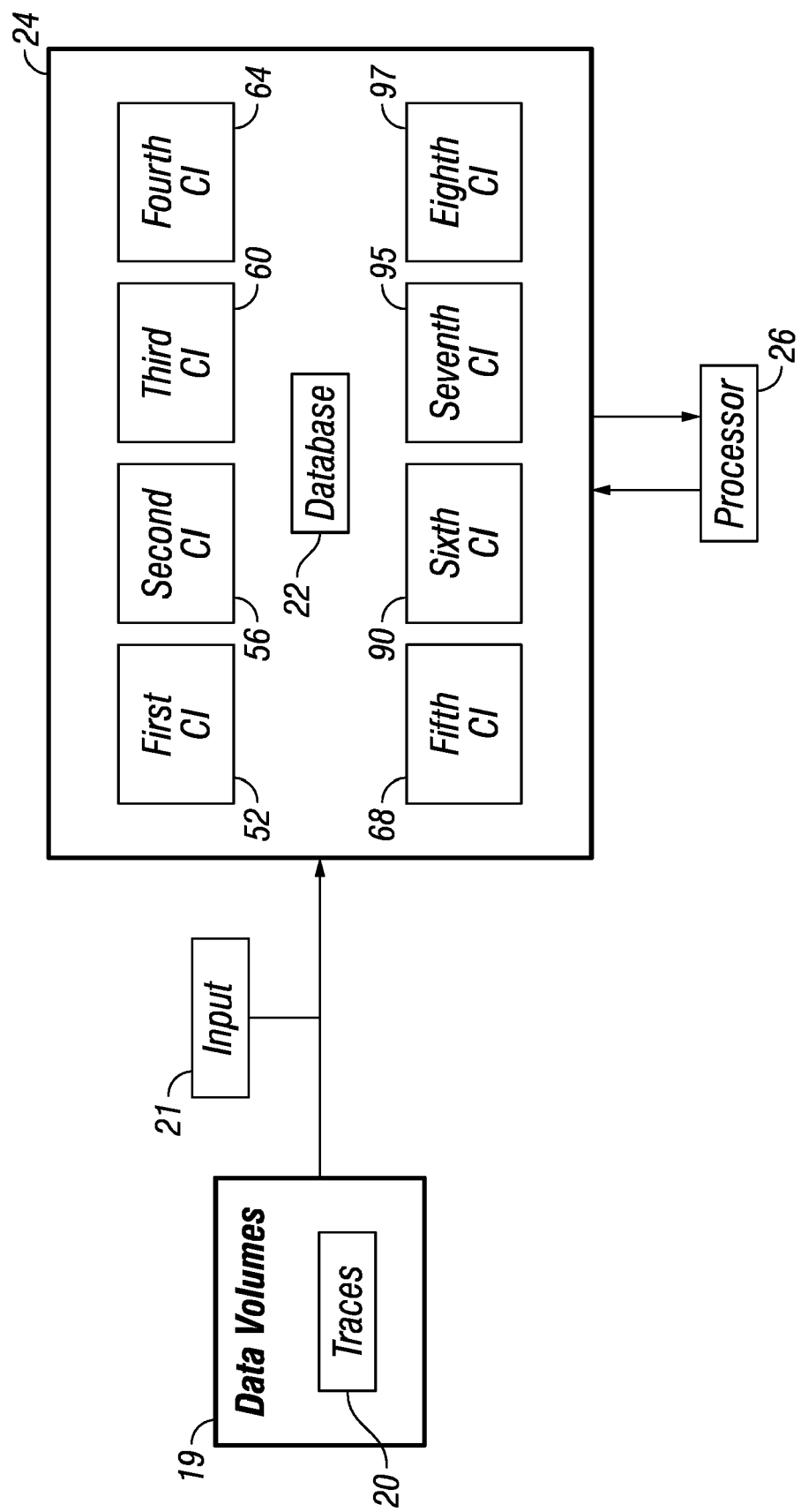
FIG. 2 is a block diagram a computerized system useable by the present method.

FIG. 2 depicts a block diagram of the components of an embodiment of a computerized system capable of performing the present method. Seismic data volumes (19), which include seismic traces (20) relating to a subsurface formation are loaded via an input device (21), which can be a keyboard, a scanner, a jump drive, a flash card, a wireless communication device, an internet enabled device, or other similar devices into a database (22), resident in data storage (24) that is in communication with a processor (26).

In a contemplated embodiment, the database (22) can be a relational database loaded from an SEGY industry standard format into a database for using seismic data. In another contemplated embodiment, the database could be POSC compliant.

The processor (26) can be any kind of processor, including a single CPU unit or a plurality connected servers having at least four gigabytes of memory. In an embodiment, an INTEL™ or AMD™ processor could be used. The processor operating system could be a LINUX™, a WINDOWS™, or UNIX™ operating system. The processor is used to compile and sort the seismic data volumes into a plurality of categories (28), depicted in FIG. 3.

A plurality of computer instructions are depicted resident in data storage (24), namely first computer instructions (52), second computer instructions (56), third computer instructions (60), fourth computer instructions (64), fifth computer instructions (68), sixth computer instructions (90), seventh computer instructions (95), and eighth computer instructions (97). Each of the plurality of computer instructions is capable of instructing processor (26) to perform one or more steps of the present method. While a plurality of computer instructions is depicted, it is contemplated that a single computer program with modular executable components could also be used, or any combination of individual computer instructions and modular computer programs.

Figure 3:
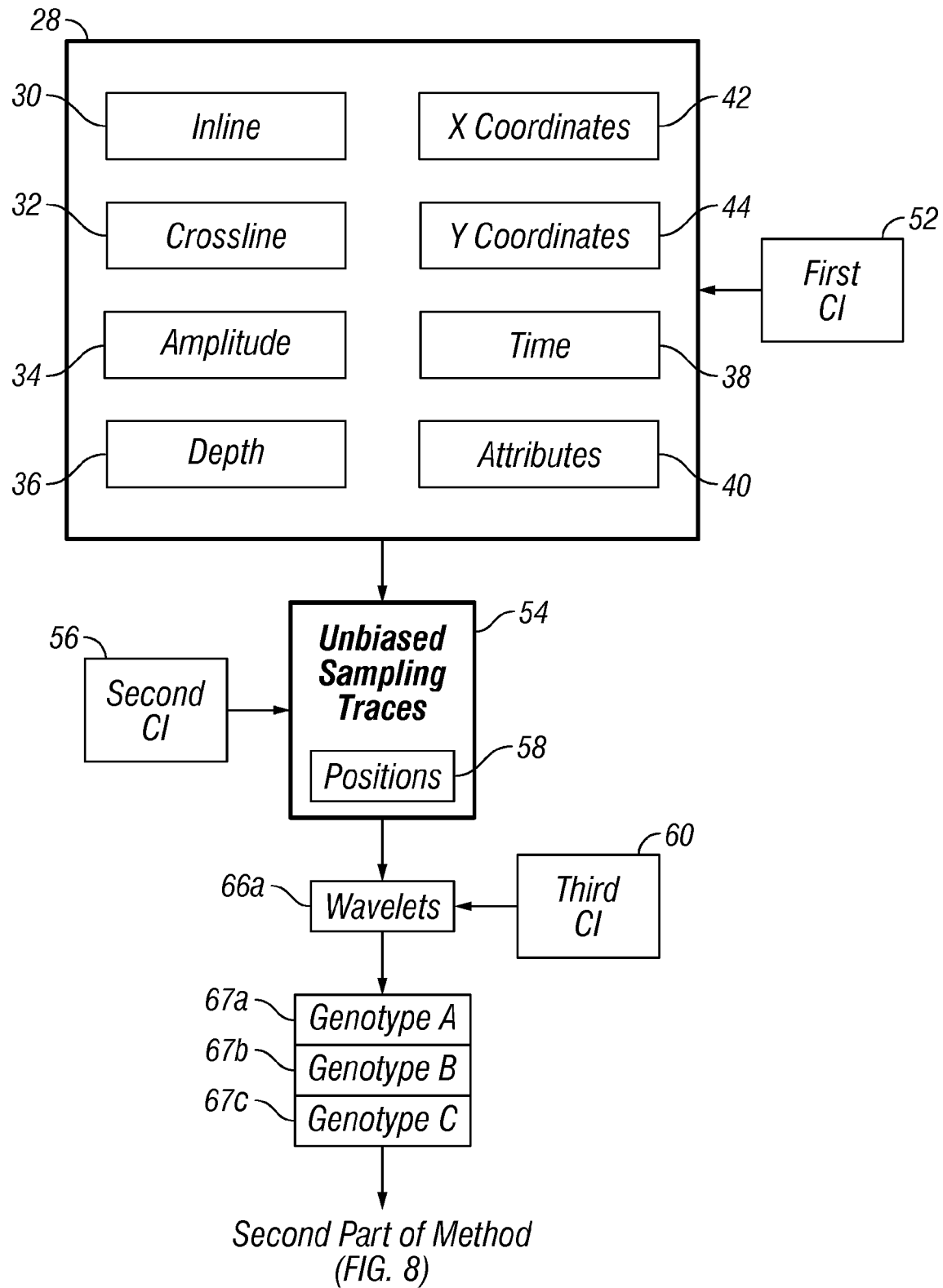
FIG. 3 is a diagram of a first portion of an embodiment of the present method.

Referring now to FIG. 3, a first portion of an embodiment of the present method is depicted, including representative categories (28) into which the seismic data volumes (19), depicted in FIG. 2, can be sorted. The categories (28) can include: inline traces of the subsurface formation (30), such as a north-south seismic line, cross line traces of the subsurface formation (32), such as an east-west seismic line, and amplitude of wavelets for the subsurface formation (34), such as amplitude of 8. Positional and dimensional categories including a depth (36), such as a Z axis value of 10000 feet or a two way time interval of 6 seconds, X coordinates (42), and Y coordinates (44) are depicted. Categories relating to sample time (38), such as two or four milliseconds, and to other attributes of the subsurface formation (40), including phase frequency, such as 4 to 100 Hz, are also depicted.

First computer instructions (52), also shown in FIG. 2 resident within the data storage (24), are used to perform an unbiased sampling on a portion of one or more of the seismic data volumes. The first computer instructions (52) are used to obtain a plurality of unbiased sampling traces (54), and one or more trace positions (58) selected from the unbiased sampling traces (54). In an embodiment, the first computer instructions (52) can select a percentage of the total traces of the sample, such as 2% or 5% of the traces, for unbiased sampling.

It is contemplated that second computer instructions (56), also depicted in FIG. 2 resident in data storage (24), can be used to generate the one or more trace positions (58) at random from the plurality of unbiased sampling traces (54).

Trace positions (58) include at least one set of wavelets (66a), which can be identified using second computer instructions (56). Third computer instructions (60) act on the wavelets (66a) to produce genotypes (67a,67b,67c) through one or more comparative analyses, as described previously. While FIG. 3 depicts three genotypes, (67a,67b,67c), any number of genotypes can be identified, depending on the sampling size.

Figure 4:
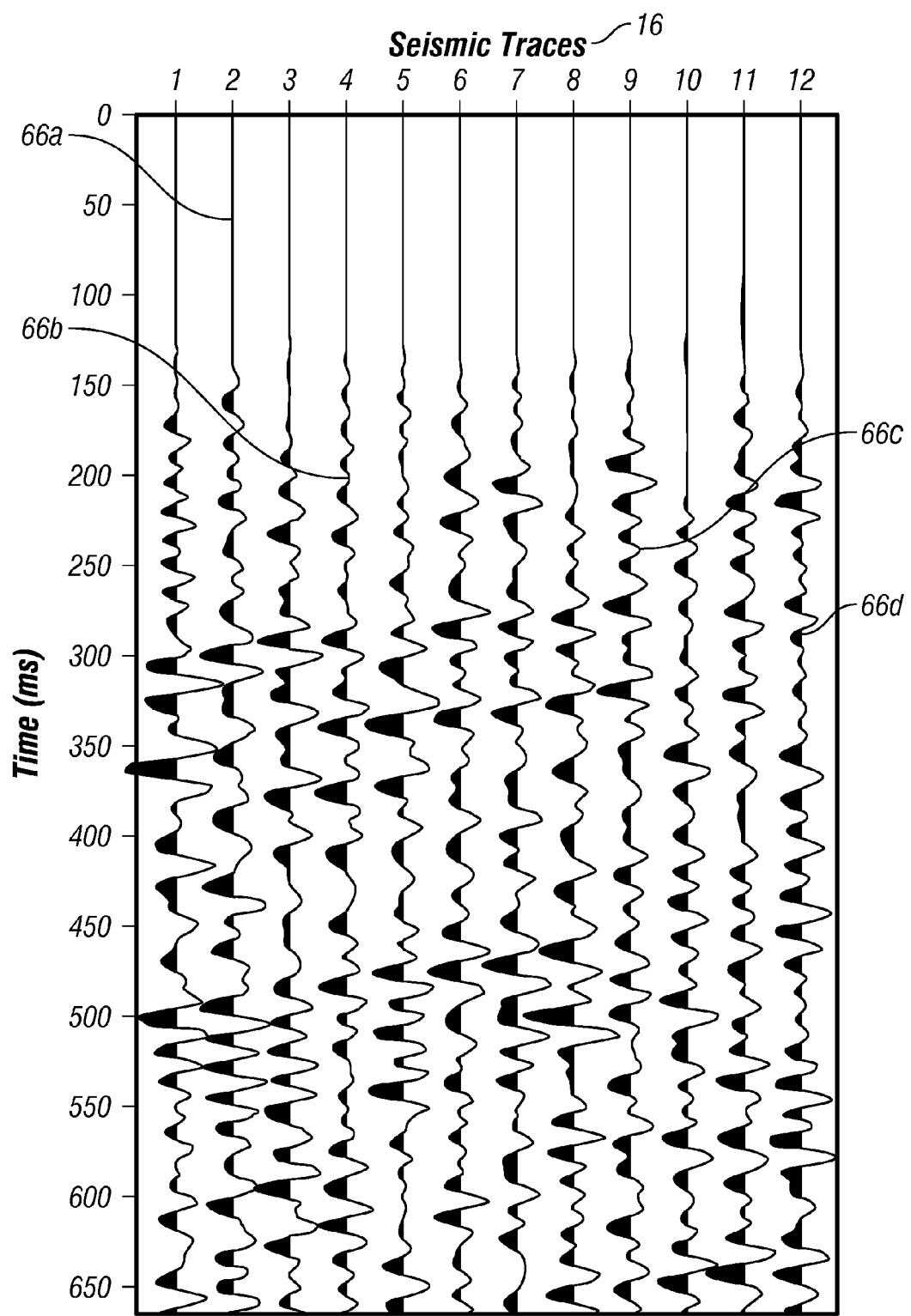
FIG. 4 is an image of exemplary seismic traces, including seismic wiggle traces and wavelets.

FIG. 4 depicts an exemplary set of seismic traces (16). A plurality of wavelets, including wavelets (66a), (66b), (66c), and (66d) are depicted within seismic traces (16).

Figure 5:
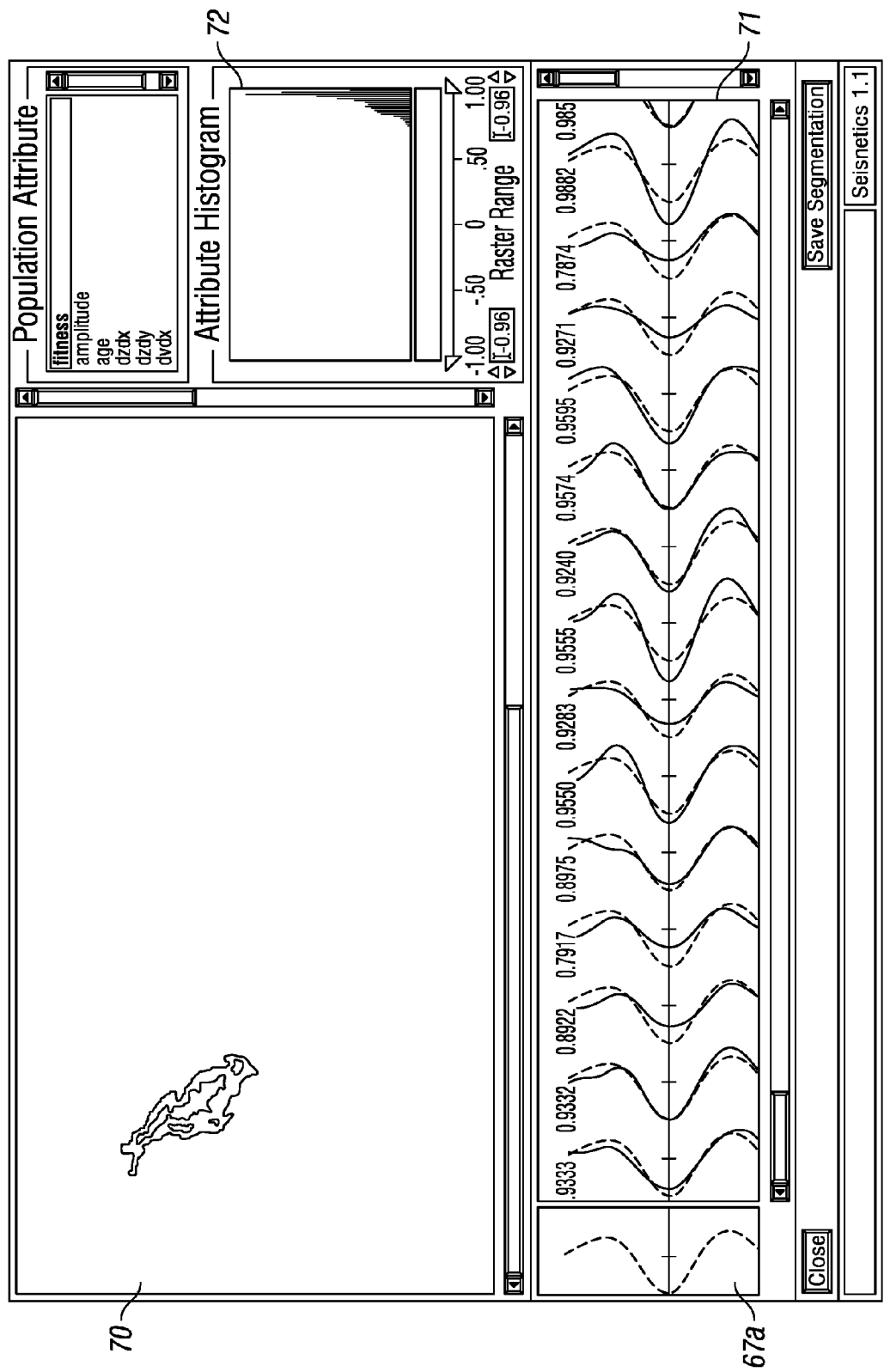
FIG. 5 is an image depicting an exemplary population having a high degree of fitness.

FIG. 5 depicts a representation of an exemplary first geopopulation (70), possessing a high degree of fitness, relating to first genotype (67a). The depiction of first geopopulation (70) can include a view of a region of a seismic trace containing the wavelet members of first geopopulation (70). The high degree of fitness of first geopopulation (70) is depicted by comparing the member wavelets of first geopopulation (70) with first genotype (67a), which can be depicted as shown in wavelet graph (71).

Wavelet graph (71) includes multiple reproductions of first genotype (67a), selected individual member wavelets, and a numerical representation of the fitness of each individual member wavelet. Histogram (72) depicts a summation of every member wavelet of first geopopulation (70), including not only the member wavelets depicted in wavelet graph (71), but each wavelet member of first geopopulation (70). Histogram (72) graphs each member wavelet of first geopopulation (70) by the member wavelet's fitness, and shows a high degree of fitness for first geopopulation (70) relative to first genotype (67a). Histogram (72) depicts the majority of the member wavelets having a fitness that approaches 1.00. It should be noted that the term "high fitness" can be used subjectively and does not necessarily indicate a geopopulation having any particular numerical fitness value.

In an embodiment, histogram (72) can include color coding, such as coloring member wavelets having high fitness varying shades of green, while coloring member wavelets having poor fitness varying shades of red and member wavelets having medium fitness shades of blue. It is contemplated that the depiction of first geopopulation (70) can include a colored representation of first geopopulation (70) where the selected coloration corresponds to the fitness of the member wavelet at the region or pixel being colored. It is also contemplated that monochrome or gray-scale displays, or entirely uncolored displays can also be used.

Figure 6:
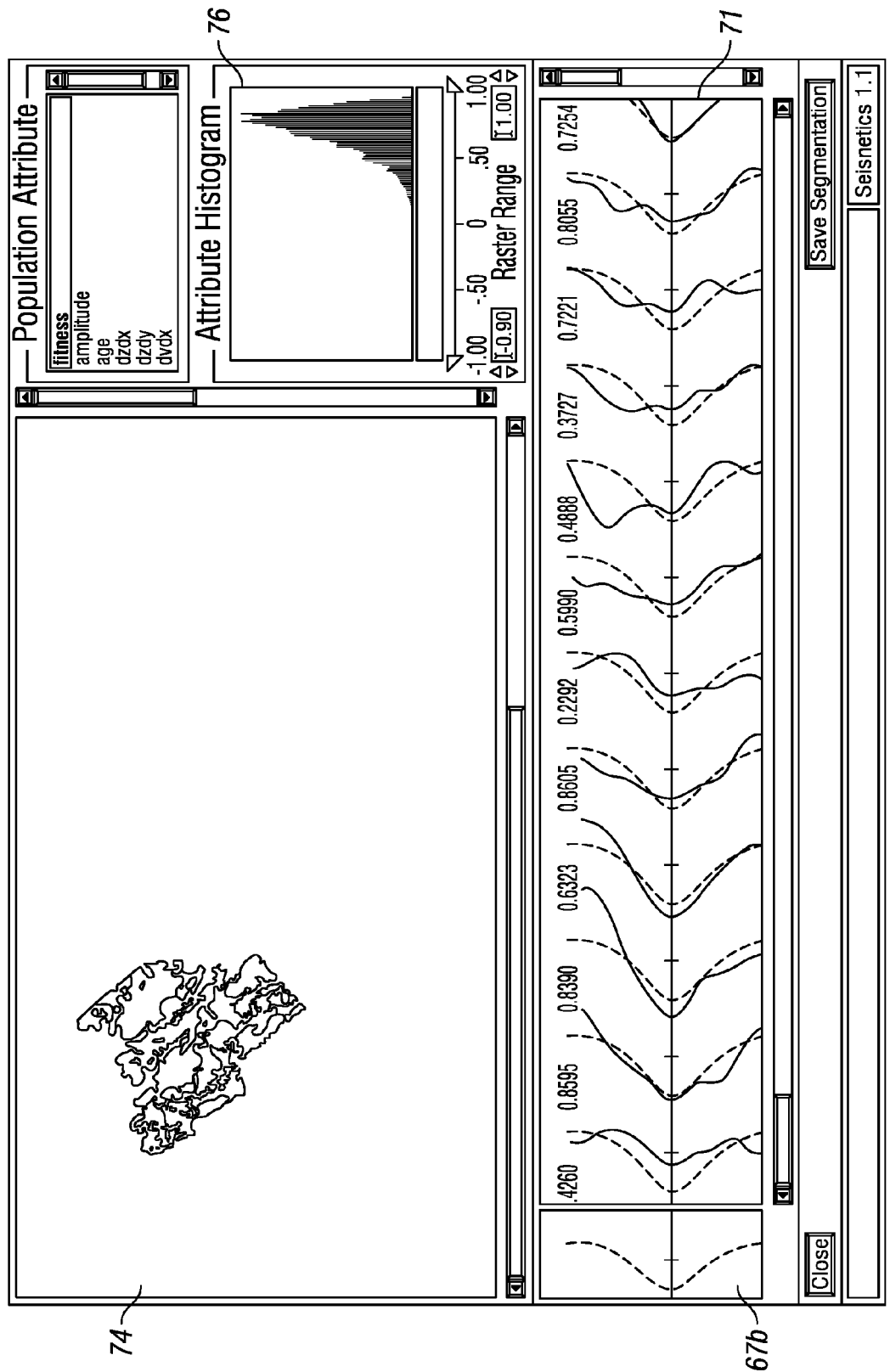
FIG. 6 is an image depicting an exemplary population having a medium degree of fitness.

FIG. 6 shows a representation of an exemplary second geopopulation (74). Second geopopulation (74) depicts a geopopulation having a medium degree of fitness, relative to a second genotype (67b). Wavelet graph (71) depicts selected individual member wavelets and multiple reproductions of second genotype (67b), and a numerical representation of the fitness of each member wavelet. Histogram (76) depicts a summation of the every member wavelet of second geopopulation (74) and shows a medium degree of fitness relative to second genotype (67b), which is shown by depicting the majority of the member wavelets having a fitness ranging from 0.50 to 1.00. It should be noted that the term "medium fitness" can be used subjectively and does not necessarily indicate a geopopulation having any particular numerical fitness value.

Figure 7:
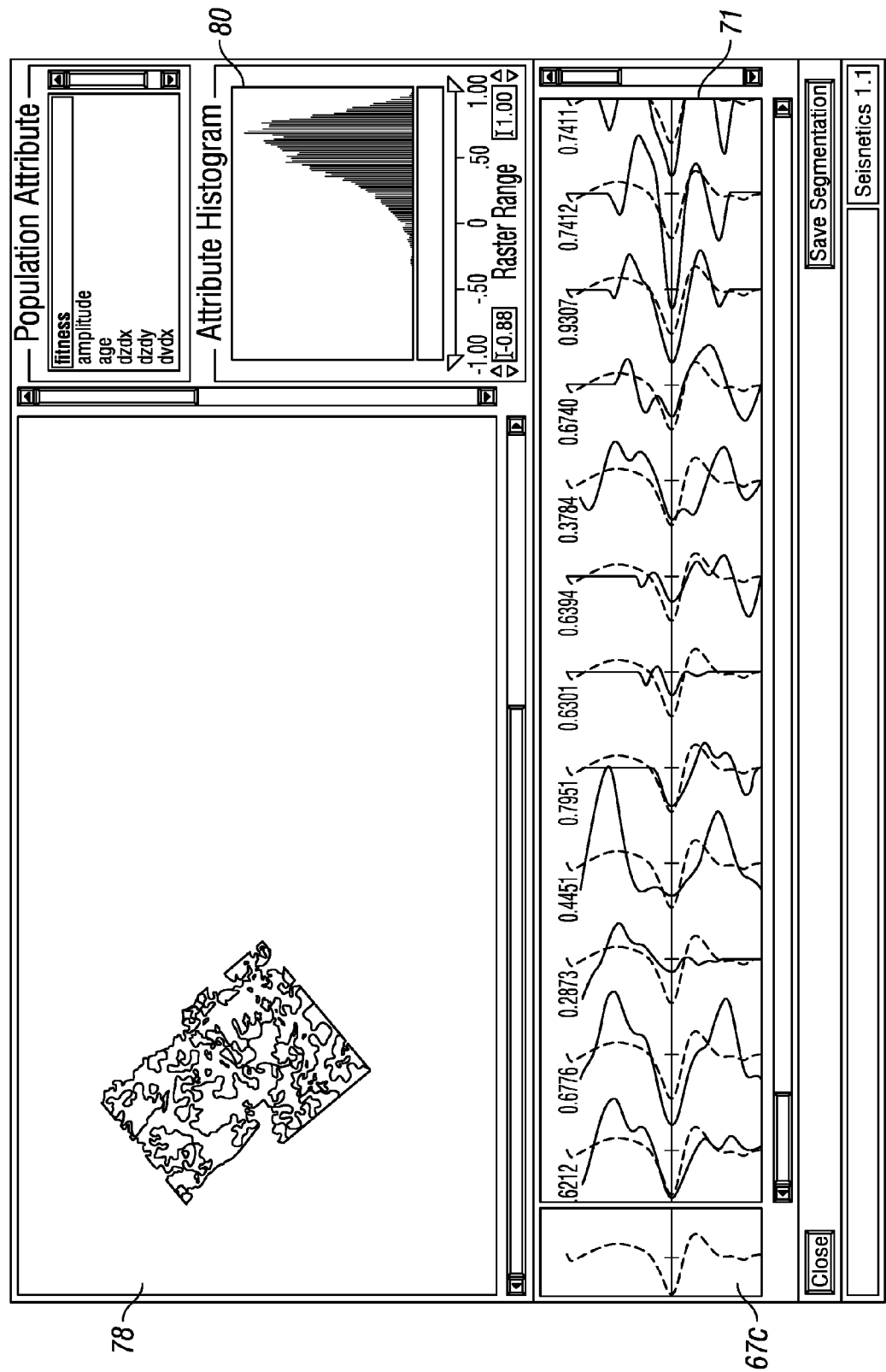
FIG. 7 is an image depicting an exemplary population having a poor degree of fitness.

FIG. 7 shows a representation of an exemplary third geopopulation (78) having a poor degree of fitness, relative to a third genotype (67c). Wavelet graph (71) depicts selected individual member wavelets, multiple reproductions of third genotype (67c), and a numerical representation of the fitness of each member wavelet. Histogram (80) depicts a summation of the every member wavelet of third geopopulation (78) and shows a poor degree of fitness relative to third genotype (67c), which is shown by depicting the majority of the member wavelets having a fitness ranging from 0.25 to 0.75. It should be noted that the term "poor fitness" can be used subjectively and does not necessarily indicate a geopopulation having any particular numerical fitness value.

Figure 8:
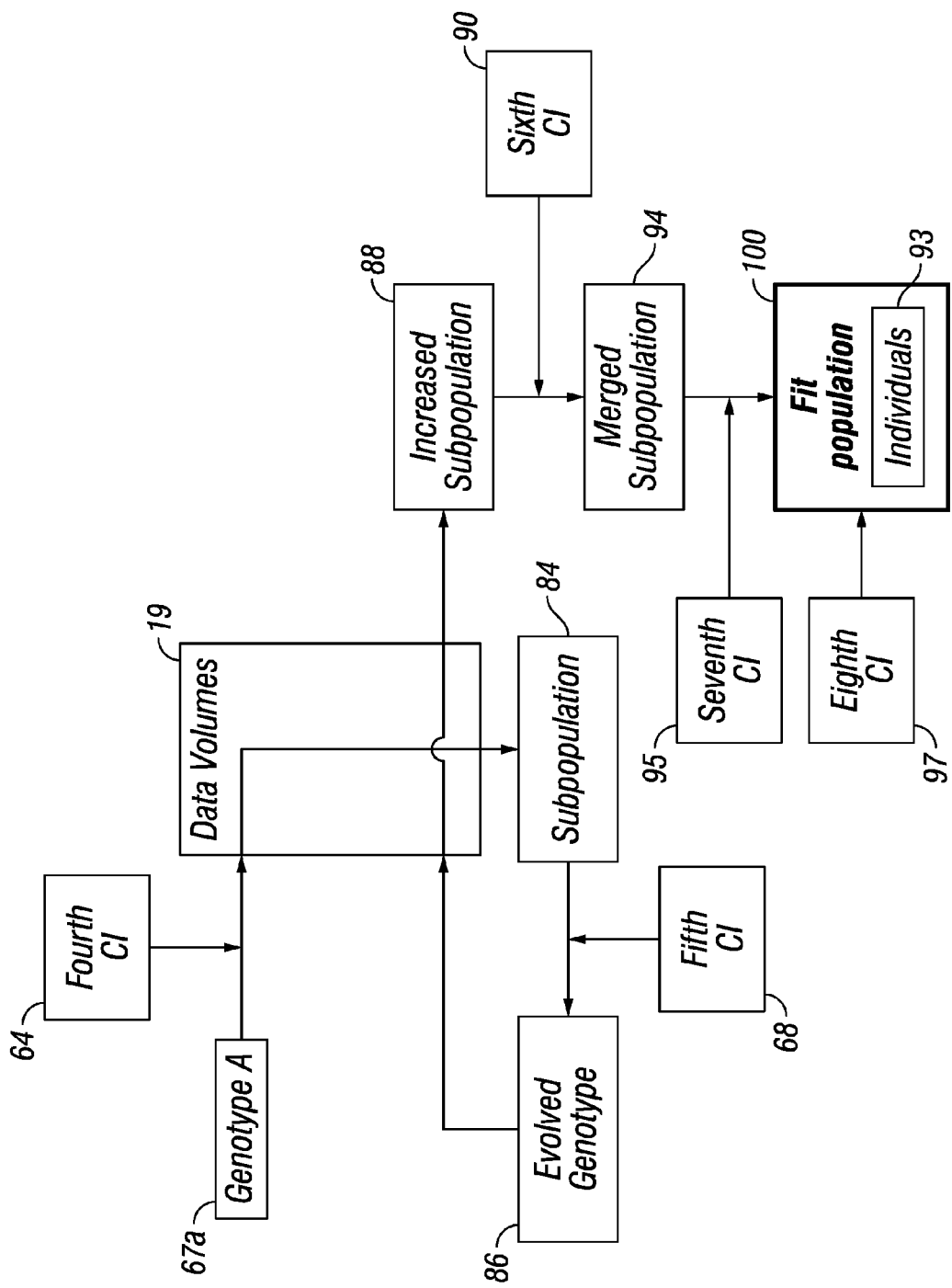
FIG. 8 is a diagram of a third portion of an embodiment of the present method.

FIG. 8 depicts a second portion of an embodiment of the present method, which is performed following the portion depicted in FIG. 3. First genotype (67a) is depicted being acted on by a fourth set of computer instructions (64), which compiles first genotype (67a) with the seismic data volumes (19), also depicted in FIG. 2, to form a subpopulation (84). A fifth set of computer instructions (68) is used to compile data in the subpopulation to identify an evolved genotype (86).

The evolved genotype (86) is then compiled with the seismic data volumes (19) to produce one or more increased subpopulations (88). An increased subpopulation is a subpopulation that has been increased through the addition of one or more wavelets using the embodied method. A sixth set of computer instructions (90) acts on the increased subpopulation (88) using the evolved genotype (86) to form a merged subpopulation (94). A seventh set of computer instructions (95) acts on the merged subpopulation (94) to identify a geopopulation with a high degree of fitness (100). An eighth set of computer instructions (97) is further used to identify at least one individual (93) within the geopopulation (100) by mapping similarities in wavelets along trace positions.

It should be noted that even though the various computer instructions are depicted as discrete sets of computer instructions, a single computer program having different executable instructions as modules is contemplated, as is any combination of modular computer programs or individual discrete sets of computer instructions. Additionally, while the computer are depicted resident in a single data storage, it is contemplated that any number of data storage devices or mediums can be used simultaneously to store any combination of computer instructions. In another embodiment, it is contemplated that the computer instructions can be resident in different data storage devices and used sequentially.

Figure 9:
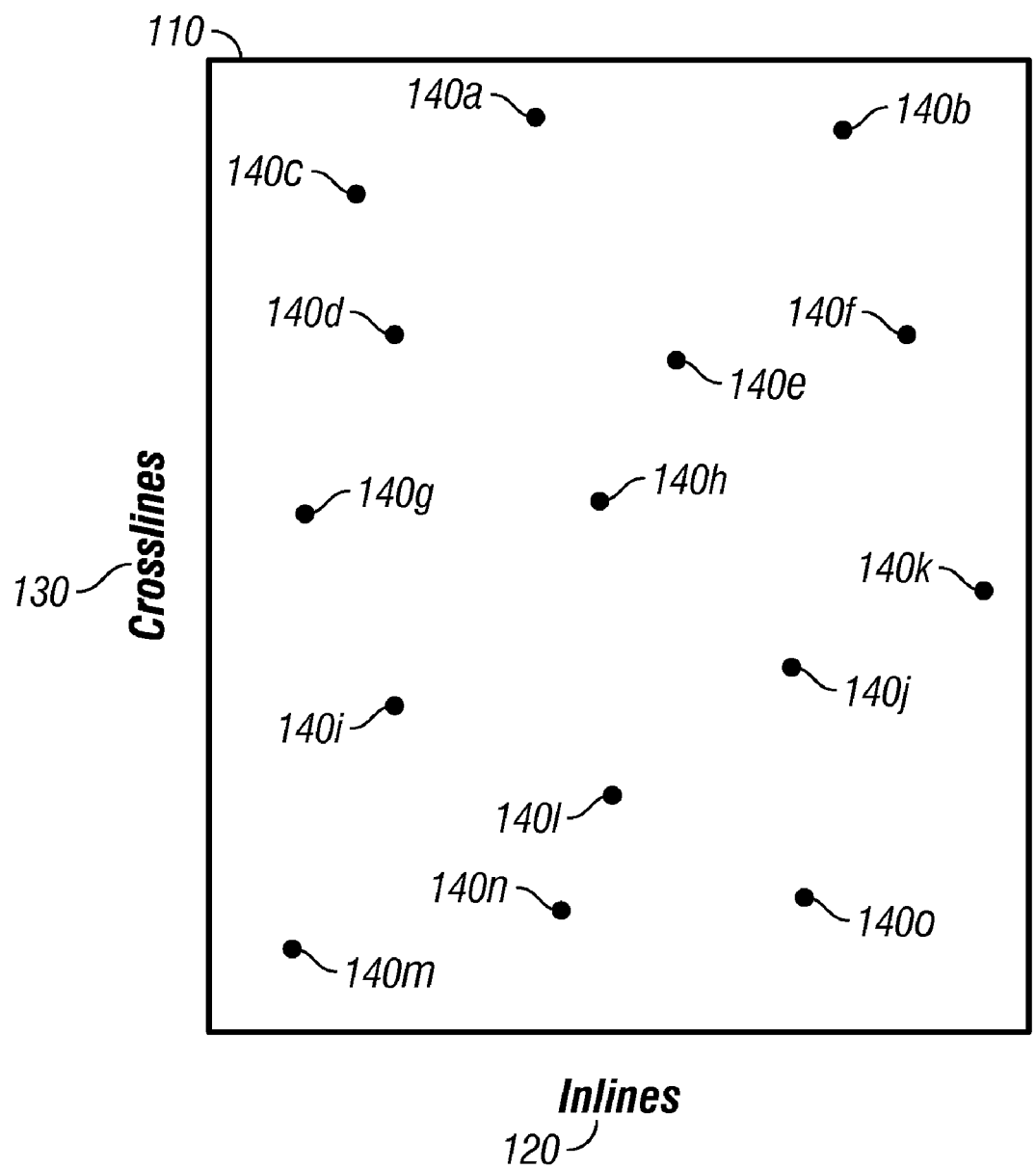
FIG. 9 depicts an exemplary random selection of seismic traces within a data volume consisting of 15600 seismic traces.

Referring now to FIG. 9, an exemplary random selection of seismic traces within a data volume is depicted.

Seismic data volume (110) includes 15,600 seismic traces. Each single seismic trace is taken along one of 104 depicted inlines (120), which are contemplated to extend from East to West, and one of the 150 depicted crosslines (130), which are contemplated to extend from North to South. Fifteen randomly selected trace positions (140a-140o) are depicted within seismic data volume (110). It is contemplated that any number of random trace positions can be selected using any method capable of generating a random number, location, or selection.

While these embodiments have been described with emphasis on the embodiments, it should be understood that within the scope of the appended claims, the embodiments might be practiced other than as specifically described herein.

What is claimed is:

1. A seismic data analysis method for predicting geological and reservoir features and structures of a subsurface using at least one three dimensional seismic data volume obtained through a geophysical exploration of the subsurface, comprising the steps of:

loading the at least one seismic data volume relating to the subsurface to data storage in communication with a processor, said processor performing:

unbiased sampling on at least one portion of the at least one seismic data volume to obtain at least one plurality of initial traces;

computing at least one plurality of samples along the at least one plurality of initial traces, wherein each of the at least one plurality of samples is defined by a position within a three dimensional lattice;

identifying at least one genotype for the at least one plurality of samples;

identifying at least one plurality of fit individuals by applying the at least one genotype to the at least one three dimensional seismic data volume;

creating at least one merged genotype using the at least one plurality of fit individuals in combination with the at least one plurality of samples; and identifying at least one geopopulation that defines the geological features or the reservoir features of the subsurface formation by applying the at least one merged genotype to the at least one three dimensional seismic data volume.

2. The method of claim 1, wherein the at least one three dimensional seismic data volume represents a two-dimensional seismic survey, a three-dimensional seismic survey, or a four-dimensional survey.

3. The method of claim 1, wherein the at least one three dimensional seismic data volume is selected from the member of the group consisting of: seismic amplitudes, energies, coherencies, continuities, other derived seismic attributes, and combinations thereof.

4. The method of claim 1, further comprising the step of discarding at least one of the plurality of fit individuals that is characterized by multiple geopopulations.

5. The method of claim 1, further comprising the steps of identifying a plurality of neighboring geopopulations, sorting the plurality of neighboring geopopulations by fitness, creating a merged geopopulation by combining at least two of the plurality of neighboring geopopulations having high fitness.

6. The method of claim 1, wherein the step of identifying the at least one genotype comprises identifying at least one seismic wavelet derived from similarities in amplitude within the at least one plurality of samples or at least one three dimensional cell derived from similarities in energy, continuity, coherency, or combinations thereof within the at least one plurality of samples.

7. The method of claim 1, wherein the subsurface formation is a mineral reservoir or a geological formation.

8. The method of claim 1, wherein the database comprises computer instructions for instructing the processor to categorize the at least one seismic data volume based on spatial orientations in numerical values, amplitude, phase, frequency, zero crossing, and combinations thereof.

9. The method of claim 1, wherein the step of performing unbiased sampling is done using a random selection from the at least one three dimensional seismic data volume, or dividing the at least one three dimensional seismic data volume into a plurality of sectors and randomly selecting at least one initial trace from each of the plurality of sectors.

10. The method of claim 9, wherein the random selection from the at least one three dimensional seismic data volume or the random selection of at least one initial trace from each of the plurality of sectors is performed using a random number generator.

11. The method of claim 1, wherein the computing of the at least one plurality of samples is performed by mapping using a zero-crossing analysis.

12. The method of claim 1, wherein the at least one genotype is a trace representation of acoustic impedance defined by wavelets.

13. The method of claim 1, wherein the processor is in communication with a server in communication with a network accessible from at least one remote location using at least one client device in communication with the network.

14. The method of claim 1, further comprising the step of compiling and sorting the at least one seismic data volume into a plurality of categories using the processor.

15. The method of claim 1, wherein the step of computing the at least one plurality of samples is performed by selecting peaks, troughs, zero-crossings, or combinations thereof for each of the at least one plurality of initial traces.

* * * * *